No. 866,860. PATENTED SEPT. 24, 1907.
C. J. HERRMANN.
PORTABLE AND ADJUSTABLE PIE CRATE.
APPLICATION FILED MAY 11, 1906.
3 SHEETS—SHEET 2.
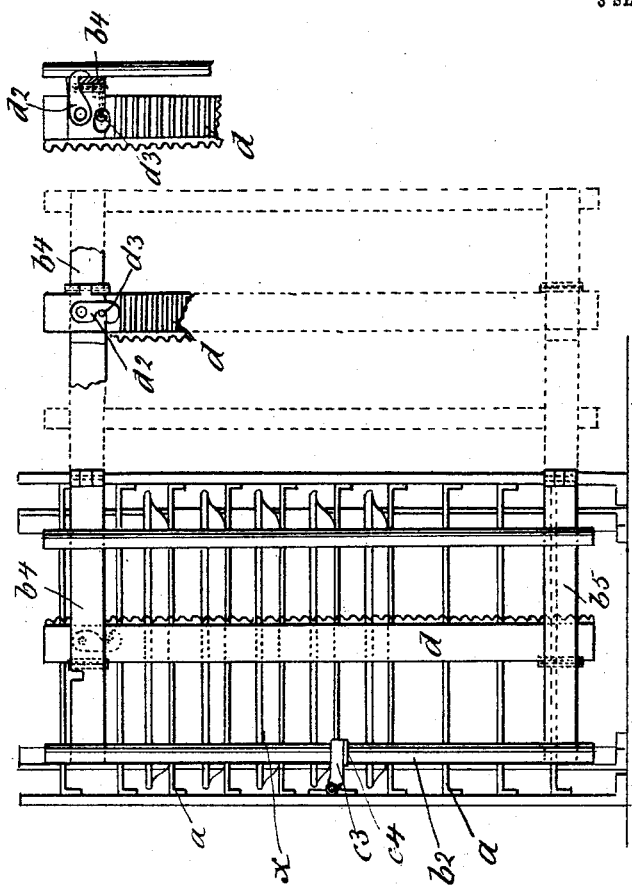
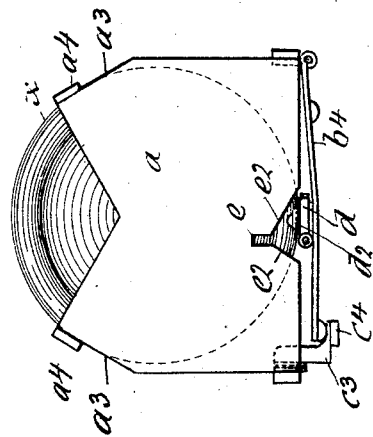
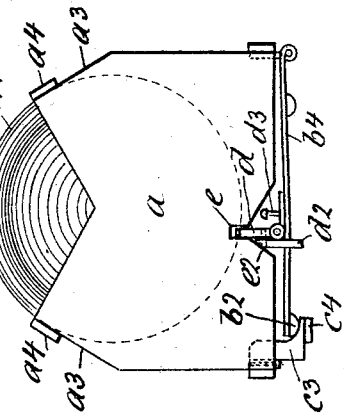
WITNESSES
INVENTOR
Carl J. Herrmann
BY Edgar Tate & Co
ATTORNEYS

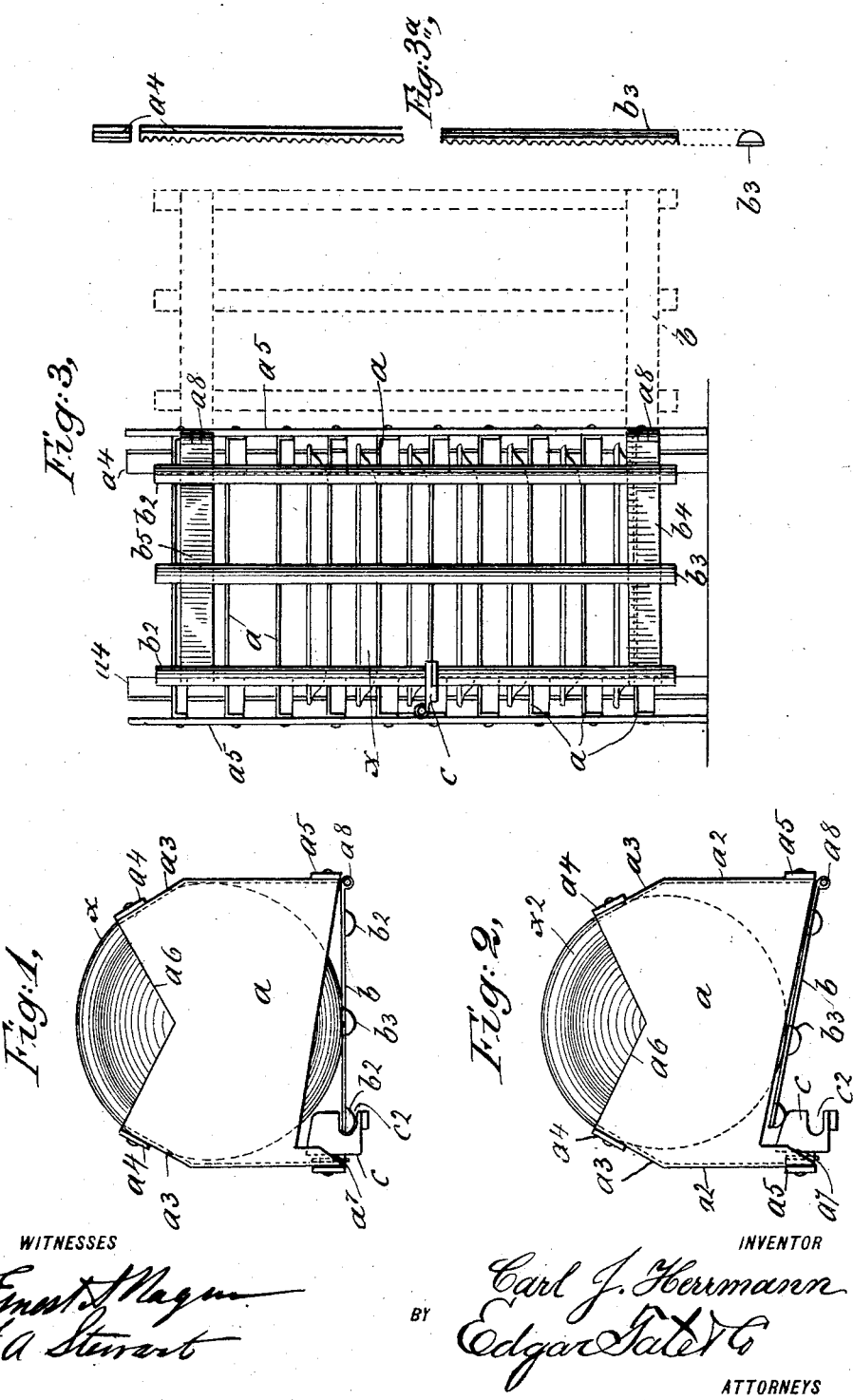

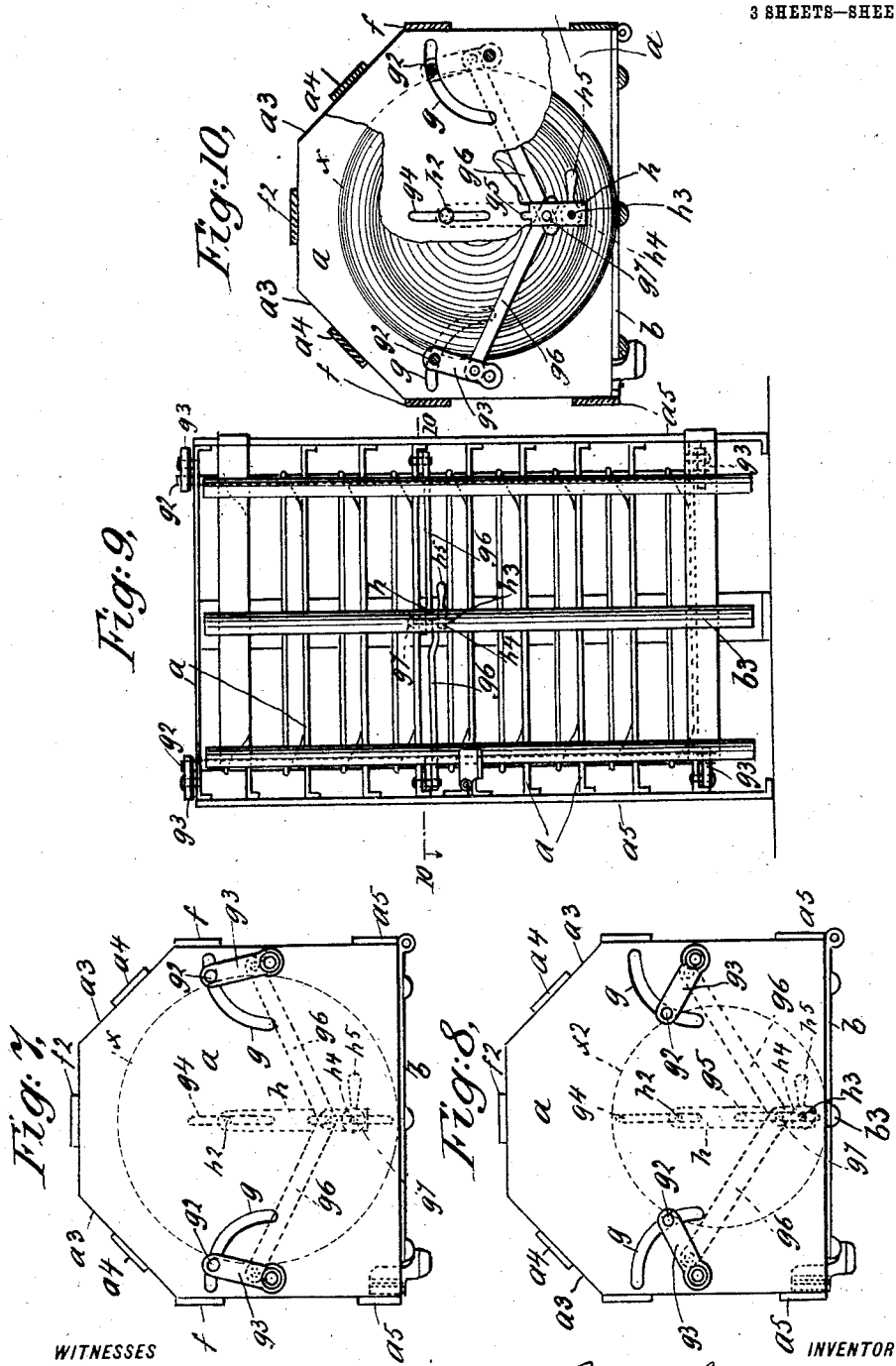

UNITED STATES PATENT OFFICE.

CARL J. HERRMANN, OF BROOKLYN, NEW YORK.

PORTABLE AND ADJUSTABLE PIE-CRATE.

No. 866,860.  Specification of Letters Patent.  Patented Sept. 24, 1907.

Application filed May 11, 1906. Serial No. 316,299.

*To all whom it may concern:*

Be it known that I, CARL J. HERRMANN, a citizen of the United States, and residing at Brooklyn, in the county of Kings and State of New York, have invented certain new and useful Improvements in Portable and Adjustable Pie-Crates, of which the following is a specification, such as will enable those skilled in the art to which it appertains to make and use the same.

This invention relates to crates and similar devices for use by bakers in packing and carrying pies for delivery to consumers; and the object of the invention is to provide an improved device of this class particularly designed for the purpose specified and which may also be used for packing and carrying other articles; a further object being to provide a crate or device of the class specified in which pie plates or pans may be locked and securely held against movement, and in which pie plates or pans of different sizes may be locked and held against movement; and with these and other objects in view the invention consists in a device of the class specified constructed as hereinafter described and claimed.

The invention is fully disclosed in the following specification, of which the accompanying drawing forms a part, in which the separate parts of my improvement are designated by suitable reference characters in each of the views, and in which;—

Figure 1 is a plan view of one form of my improved pie packing and carrying crate and showing pie plates or pans of large size placed and locked therein; Fig. 2 a similar view, the plates or pans employed being of smaller size; Fig. 3 a front view of the crate shown in Fig. 1; Fig. 3ª a side view of certain details of the construction; Fig. 4 a view similar to Fig. 1 but showing another form of construction; Fig. 5 a view similar to Fig. 1 but showing the parts in a different position and showing smaller plates or pans; Fig. 6 a front view of the device as shown in Fig. 1 illustrating details of the construction; Fig. 7 a view similar to Figs. 1 and 2 but showing another modification and indicating the method of packing and carrying large plates or pans; Fig. 8 a view similar to Fig. 7 but indicating the method of packing and carrying smaller plates or pans; Fig. 9 a front view of the device as shown in Fig. 7; and, Fig. 10 a section on the line 10—10 of Fig. 9.

In the practice of my invention as shown in Figs. 1 to 3 inclusive I provide a crate comprising a series of horizontal partitions $a$ which are preferably of the form shown in Figs. 1 and 2, the opposite sides thereof being parallel as shown at $a^2$, and the back corners being beveled as shown at $a^3$ and connected by vertically arranged posts $a^4$ while the front corners of said partitions are connected by vertically arranged posts $a^5$, and with this form of construction it will be seen that the rear corner posts $a^4$ are narrower than the front corner posts, and the partitions $a$ are preferably cut out at the back to form V-shaped recesses $a^6$ so that the crate can be easily cleaned. The front edges of the partitions $a$ are cut out inwardly from the right hand corners thereof to the opposite side so as to form triangular recesses $a^7$ and hinged at the right hand corner as shown at $a^8$ is an openwork door $b$ composed, in the form of construction shown, of vertically arranged opposite side bars $b^2$ and a similarly arranged central bar $b^3$, said bars being connected by bottom and top strips $b^4$ and $b^5$. Hinged to the left hand corner post $a^5$ at the front of the crate and preferably about midway thereof is a vertically swinging lock $c$ which is adapted to hold the door $b$ in different positions, as clearly shown in Figs. 1 and 2, the inner edge of said lock holding the door $b$ in the position shown in Fig. 2 and the recess $c^2$ in said lock serving to hold the door in the position shown in Fig. 1.

The door $b$ is shown in the closed position in full lines in Fig. 3 and in the open position in dotted lines, and in Figs. 1 and 3 I have shown the larger size of pie pans or plates placed in the crate, said pie pans or plates being designated by the reference character $x$, and in Fig. 2 a smaller size of pie pans or plates is shown and designated by the reference character $x^2$. It will be understood that the pie pans or plates are inserted into the crate from the front when the door $b$ is open, and the rear edges of said pans or plates press against the posts $a^4$ while the central member $b^3$ of the door presses against the front edges thereof, and in this way the pie pans or plates are securely held in the crate against lateral or other movement.

The construction shown in Figs. 4 to 6 inclusive is substantially the same as that shown in Figs. 1 to 3 inclusive with the exception of the front edges of the partitions $a$ and the form of the lock and door. In this form of construction I provide a hinged lock $c^3$ having a projecting finger $c^4$ which engages the left hand bar $b^2$ of the door, and hinged to the bottom and top strips $b^4$ and $b^5$ of the door is a vertical strip $d$ provided at the top with a pivoted catch $d^2$ adapted to engage the transverse door strip $b^4$ in one position and a headed screw $d^3$ in another position. The headed screw $d^3$ is secured to the door strip $b^4$ and passes through a large hole in the strip $d$, and when the parts are in the position shown in Fig. 4 the strip $d$ is locked by the catch $d^2$ engaging the screw $d^3$, and when the parts are in the position shown in Fig. 5 the strip $d$ is locked by the catch engaging the door strip $b^4$.

In the form of construction shown in Figs. 4 to 6 inclusive the partitions $a$ are provided at the front with inwardly directed recesses $e$ having beveled sides $e^2$, and when large pans or plates are used as shown in Fig. 4 the locking strip $d$ is held flush with the door, but when small plates or pans are used as shown in Fig. 5 the locking strip is locked in the position shown in said figure and projects into the recesses $e$.

In Figs. 7 to 10 inclusive I have shown another form of construction in which the partitions $a$ have parallel side edges, a straight front edge, and a straight back edge, the corners thereof being beveled, and in this form of construction the front corner posts $a^5$ and rear corner posts $a^4$ are employed together with intermediate side posts $f$ and a back post $f^2$, but the intermediate side posts $f$ and back post $f^2$ are not absolutely essential and may or may not be employed. In this form of construction all the partitions $a$ are provided in the opposite side portions thereof with segmental slots $g$ through which are passed vertical rods $g^2$, and one or more of said partitions, preferably the top and bottom partitions and one of the intermediate partitions, are provided with pivoted arms $g^3$ which are connected with the rods $g^2$, and one or more of said partitions are also provided with forwardly and backwardly ranging slots $g^4$ and $g^5$, and connected with the arms $g^3$ are links $g^6$ which are pivotally connected by a pin $g^7$ to a forwardly and backwardly ranging strip $h$, and said strip is also provided with a headed pin $h^2$ which passes through the rearward slot $g^4$ in said partition, and said strip is also provided at its forward end with a headed and threaded pin $h^3$ which passes through the forward slot $g^5$ in said partition, and on the lower end of which is a nut $h^4$ provided with a handle $h^5$, and by means of this construction the vertically arranged rods $g^2$ which are passed through the segmental slots $g$ in the partitions $a$ may be swung into the position shown in Fig. 7 and locked therein, or into the position shown in Fig. 8 and locked therein.

When it is desired to place pie plates or pans of the larger size in the crate, as shown in Figs. 7 and 9, the rods $g^2$ are swung into the position shown in Fig. 7 and locked in said position, the door $b$ is opened and the pans or plates are inserted from the front of the crate, after which the said door is locked. When it is desired to use the smaller size of pans or plates the rods $g^2$ are swung into the position shown in Fig. 8 and locked in said position, and with both forms of construction the door $b$ aids, when locked, in holding the pans or plates in position as will be readily understood, and this is also true of the construction shown in Figs. 1 to 3 inclusive, and with that shown in Figs. 4 and 6 inclusive.

In each of the forms of construction shown it will be seen that my improved crate consists of vertically arranged posts or supports, horizontal partitions secured thereto, and an openwork door hinged to one of the front side corners of the crate, said door being provided with a lock, and the construction of the body portion of the crate and the door being such that a series of plates or pans of one size, or a series of plates or pans of another size may be placed in said crate and locked therein against movement, by the door.

In order to prevent the pie pans or plates from moving vertically in the crate the posts $a^4$ and the central member $b^3$ of the door $b$ may be provided with corrugated inner surfaces as shown in Fig. 3$^a$ and this may be done by corrugating the posts $a^4$ or the part $b^3$ of the door $b$ or by securing corrugated strips to said members; and when the form of construction shown in Figs. 4 to 6 inclusive is employed the strip $d$ which is connected with the door $b$ may be corrugated on one side and provided with a corrugated face edge for a similar purpose, and these corrugations may be formed by means of separate parts secured to the strip $d$, and it will also be apparent that the rods $g^2$ employed in the construction shown in Figs. 7 to 10 inclusive may have similar corrugated surfaces.

Having fully described my invention, what I claim as new and desire to secure by Letters Patent, is:—

1. A crate of the class described, comprising vertically arranged posts or members, horizontal partitions secured thereto, a door hinged to one of the front side corners of the crate, and a door lock connected with the opposite front side corner, said lock being provided with means whereby the door may be locked in different positions.

2. A crate of the class described, comprising vertically arranged posts or members, horizontal partitions secured thereto, a door hinged to one of the front side corners of the crate, and a door lock connected with the opposite front side corner, said lock being provided with means whereby the door may be locked in different positions, and the horizontal partitions being cut out from the corner of the crate at which the door is hinged transversely and inwardly of the opposite corner.

3. An openwork crate, comprising vertical front and back posts, horizontal supports secured to said posts, said supports being adapted to receive plates or pans of different sizes, two of said supports being sufficiently far apart to permit of said plates or pans being passed between the same, and means for locking separate series of plates or pans of different sizes in said crate.

4. An openwork crate, comprising vertical front and back posts, horizontal supports secured to said posts, said supports being adapted to receive plates or pans of different sizes, two of said supports being sufficiently far apart to permit of said plates or pans being passed between the same, and means for locking separate series of plates or pans of different sizes in said crate, said crate being also provided with a door which is hinged to one of said posts, and means for locking said door in a closed position.

5. An openwork crate, comprising vertically arranged front and back posts, horizontal supports secured thereto and designed to support plates or pans, a door hinged to one of the front corners of said crate, and means whereby a series of plates or pans placed on said supports may be locked in the crate when the door is closed.

6. An openwork crate, comprising vertically arranged posts or supports, horizontal partitions secured to said posts or supports, a door hinged to one of the front side corners of said crate, and means whereby a series of plates or pans may be locked on said partitions when the door is closed.

7. An openwork crate, comprising vertically arranged posts or supports, horizontal partitions secured thereto, a door hinged to one of the front corners of the crate and a lock for said door, one of said parts, the lock or the door, being provided with means whereby different series of plates or pans of different sizes may be locked in said crate by closing and locking the door.

8. A crate of the class described, comprising vertically arranged posts or members, horizontal supports secured thereto, said supports being cut out at their back edges, a door hinged to one of the front side corners of the crate, and a lock for said door connected with the opposite front side corner, the vertically arranged posts or members at the back of the crate being closer together than the vertically arranged posts or members at the front of the crate, and one of said parts, the lock or the door, being provided with means whereby different series of plates or pans of different sizes may be locked in the crate by the door against lateral movement.

In testimony that I claim the foregoing as my invention I have signed my name in presence of the subscribing witnesses this 9th day of May 1906.

CARL J. HERRMANN.

Witnesses:
F. A. STEWART,
C. E. MULREANY.